Nov. 3 1925.

C. W. BECK 1,560,134

STEERING WHEEL

Filed Nov. 6, 1924 2 Sheets-Sheet 1

Inventor

Charles W. Beck

Nov. 3, 1925.
C. W. BECK
STEERING WHEEL
Filed Nov. 6, 1924
1,560,134
2 Sheets-Sheet 2
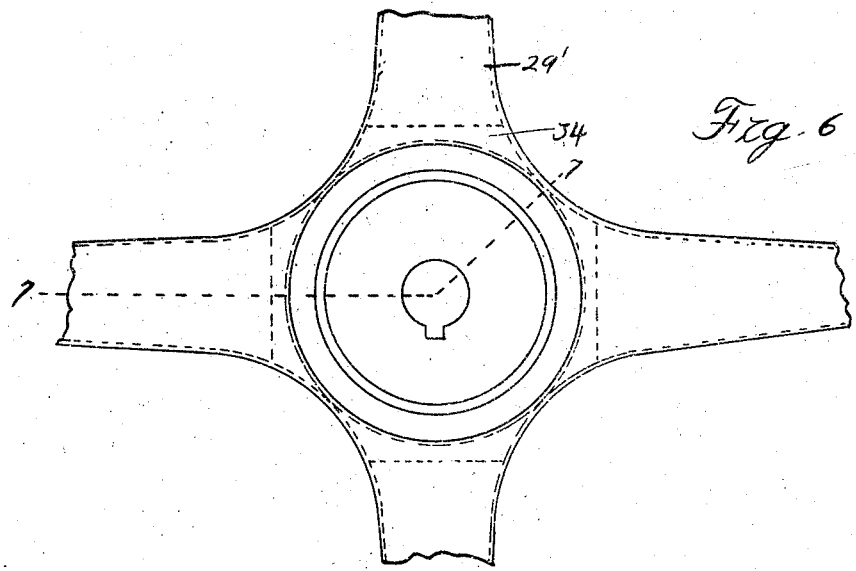
Fig. 6
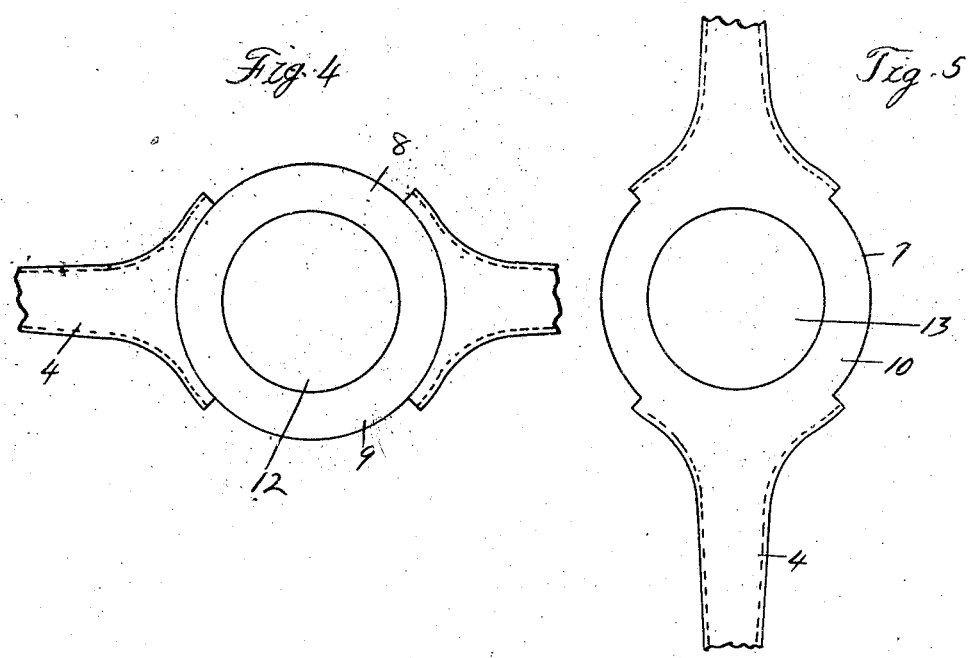
Fig. 4
Fig. 5
Inventor
Charles W. Beck
Attorneys Patented Nov. 3, 1925.

1,560,134

UNITED STATES PATENT OFFICE.

CHARLES W. BECK, OF DETROIT, MICHIGAN, ASSIGNOR TO THE BECK-FROST CORPORATION, OF DETROIT, MICHIGAN, A CORPORATION OF MICHIGAN.

STEERING WHEEL.

Application filed November 6, 1924. Serial No. 748,141.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates generally to wheels and refers more particularly to steering wheels of the built up type that are designed for use in connection with motor vehicles, boats and the like.

One of the essential objects of the invention is to provide a wheel of this type having spider arms that are preferably tubular in form and are rigidly and permanently connected to a die cast hub piece.

Another object is to provide simple and effective means for preventing the molten metal from entering the tubular arms during the die casting operation and for materially reinforcing and strengthening the joint between the hub piece and spider arms.

A further object is to provide a strong and durable wheel that is simple in construction and can be manufactured at a comparatively low cost.

With the above and other objects in view the invention consists in certain novel features of construction, combinations and arrangements of parts as will be more fully described and particularly pointed out in the appended claims.

In the accompanying drawings—

Figure 4 is a detail view of the uppermost stamping.

Figure 5 is a detail view of the lowermost stamping.

Figure 6 is a top plan view of a slightly modified form of wheel.

Figure 1:
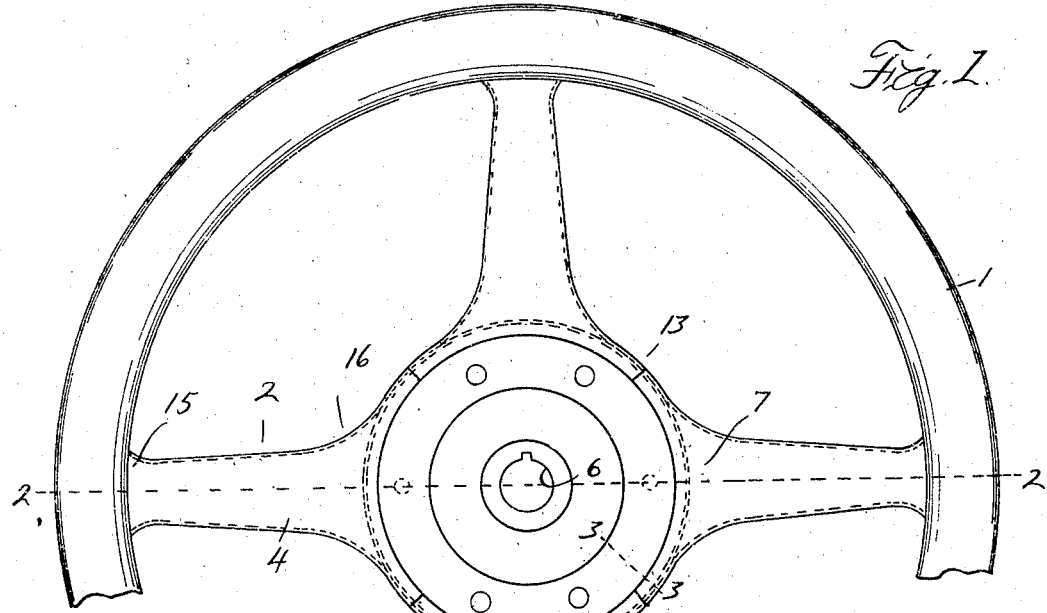
Figure 1 is a top plan view of a steering wheel embodying my invention.

Referring now to the drawings in which like characters of reference designate corresponding parts throughout the several views, the numeral 1 designates a rim, preferably of wood, supported upon a spider 2 which is preferably constructed entirely of metal and includes a hub piece 3 and a plurality of radially extending arms 4. As shown, the hub piece 3 is preferably cup-shaped in form and is provided at its lower end with a relatively short neck portion 5 having a tapering bore 6 therethrough for receiving the usual steering stem, (not shown).

The spider arms 4 are preferably formed of two sheet metal stampings 7 and 8 respectively that cross each other at the upper end of the hub piece and are permanently secured to the rim.

Figure 2:
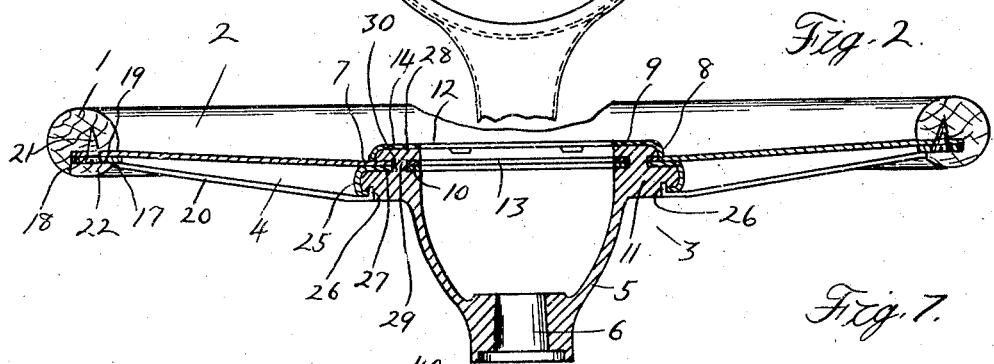
Figure 2 is a sectional view taken on the line 2—2 of Figure 1.

These stampings are preferably provided at the point of intersection with circular portions 9 and 10 respectively that engage an annular enlargement or flange 11 at the upper end of the hub piece and are provided with openings 12 and 13 respectively that register with the open upper end of the hub piece. The circular portion 10 of the lowermost stamping is preferably embedded in a reduced annular portion 14 of the flange 11, while the circular portion 9 of the upper stamping is preferably embossed upwardly to receive the reduced annular portion 14 of the flange 11. To provide a convenient grip for the driver, both stampings 7 and 8 are preferably tubular in form from the rim 1 to the flange 11. As shown, the tubular portions of the arms are flared as shown at 15 and 16 respectively, for engagement with the flange 11 and rim 1, while the intermediate portions of the arms 4 preferably taper gradually from the flared portions 15 to the flared portions 16. As shown in Figures 1 and 2, the flared portions 15 preferably terminate at the inner periphery of the rim 1 and are preferably provided with relatively short marginal flanged extensions 17 that are preferably semi-circular in form and engage correspondingly shaped recesses or pockets 18 in the rim 1. Suitable metallic reinforcing fillets 19 engage the extensions 17 inside the marginal flanges 20 and extend a short distance within the tapered portions of the spider arms 4, while suitable screws 21 are preferably driven through the fillets 19 and the extensions 17 for securing the arms 4 to the rim. Wooden segments 22 are preferably placed in the recess 18 to conceal the screws 21 and fillets 19 after the arms have been attached to the rim.

For rigidly securing the spider arms 4 to the hub piece 3, I preferably provide a sheet metal ring 25 that surrounds the flange 11 within the flared portions 16 of the arms and is secured to the latter by means of relatively short tongues or flanges 26 that extend upwardly from the inner flared ends of the tubular portions of the arms 4. These tongues 26 are preferably bent around the lower edges of the ring 25 and are embedded in the flange 11 of the hub piece. To insure a rigid connection between the ring 25, lower stamping 7, and hub piece 3, the ring 25 is preferably provided at its upper edge with an annular flange 27 that bears against the circular portion 10 of the lower stamping and is rigidly connected thereto by portions 28 of the hub piece that extend through aligned openings 29 and 30 respectively in the flange 27 and stamping 7.

In the process of construction, the stampings 7 and 8 are assembled upon the ring 25 and are secured thereto by bending the tongues 26 around the lower edges of the ring. The hub 3 is then cast upon the assembled ring and stampings to provide the finished spider. Thus, the spider arms 4 are secured to the hub piece 3 by a single operation.

From the foregoing description it will be readily apparent that the ring 25 effectively prevents any of the molten metal of the hub piece from entering the tubular portion 4 of the stamping during the die casting operation. Moreover the ring 25 cooperates with the tongues 26 to secure the spider arms 4 of the stampings 7 and 8 in assembled position.

Figures 3, 7:
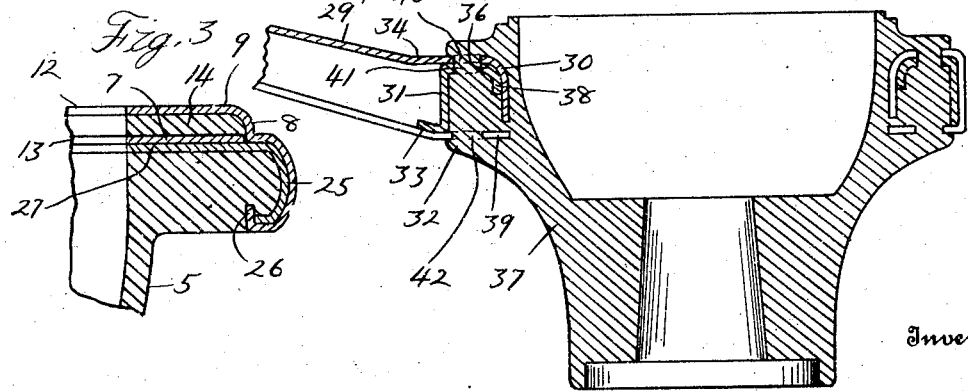
Figure 3 is a fragmentary sectional view taken on the line 3—3 of Figure 1.
Figure 7 is a sectional view taken on the line 7—7 of Figure 6.

In Figures 6 and 7 I have shown a slight modification in which the spider arms 29' are preferably formed from a single sheet of metal which has an opening cut away at the centre thereof to provide a series of radially extending tongues 30. With this construction, the ring 31 surrounding the flange 32 of the hub piece is preferably provided at its lower edges with relatively short radially extending projections 33 that extend into the inner flared portions 34 of the spider arms 29 and is provided at its upper edges with an inwardly extending annular flange 36, that is embedded in the hub piece 37 and that is preferably provided with a marginal depending flange 38. To provide a strong and durable connection between the spider arms and the hub piece, the bottoms 39 of the hollow flared portions 34 of the arms are embedded in the hub piece 37 and preferably extend transversely thereof, while the tongues 30 of the hollow flared portions 34 are preferably bent over the annular flange 36 of the ring 31 and against the depending marginal flange 38.

To insure a rigid connection, the tongues 30 and bottoms 39 of the hollow flared portions 34 as well as the annular flange 36 of the ring 31, are provided with aligned openings 40, 41 and 42 respectively which receive portions of the hub piece 37 during the die casting operation.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a steering wheel, a spider having a die cast hub, a plurality of hollow radially extending arms, and a ring having portions extending into the hollow arms and having portions embedded in the hub.

2. In a steering wheel, a spider having a die cast hub, a ring surrounding the hub, having a flange embedded in the hub, and a plurality of radially extending arms having portions secured to said flange.

3. In a steering wheel, a spider having a die cast hub, a plurality of radially extending hollow arms, and a ring surrounding the hub having portions extending into the arms, and having a flange embedded in the hub.

4. In a steering wheel, a spider having a hub, a plurality of hollow arms secured thereto, and a reinforcing ring surrounding the hub having portions extending into the arms.

5. In a steering wheel, a spider having a plurality of hollow radially extending arms, a reinforcing ring having portions engaging said arms, and a hub having portions extending through said ring and arms and securing the same together.

6. In a steering wheel, a spider having a plurality of hollow radially extending arms, a reinforcing ring having portions disposed within said arms and having an annular flange, and a hub cast within said ring and having portions extending through said flange.

7. In a steering wheel, a spider having a ring, a plurality of radially extending arms having portions extending above and below said ring, and a hub cast within said ring and having portions extending through said arms.

8. In a steering wheel, a spider having a ring, a plurality of radially extending arms having portions extending above and below said ring, said ring having a flange, and a hub cast within said ring and having portions extending through said flange.

9. In a steering wheel, the combination with a cast hub, of a spider including two members crossed at the hub and embedded therein, said members having tubular portions projecting radially from the hub constituting spider arms.

10. In a steering wheel, the combination with a cast metal hub, of a spider including two crossed members, one of said members being permanently anchored in the cast hub, the other member being secured to the first member, and both members having tubular portions projecting radially from the hub constituting spider arms.

11. In a steering wheel, the combination with a cast metal hub, of a spider including two crossed members having portions embedded in the hub and having portions projecting radially from the hub constituting spider arms.

12. In a steering wheel, a spider having a ring, a plurality of radially extending arms having portions extending above and below said ring, and a hub within said ring having a portion above said arms.

In testimony whereof I affix my signature.

CHARLES W. BECK.